United States Patent
Jeong et al.

(10) Patent No.: US 9,497,784 B2
(45) Date of Patent: Nov. 15, 2016

(54) APPARATUS AND METHOD OF ESTABLISHING INTERFACE IN A LOCAL NETWORK

(75) Inventors: Sang-Soo Jeong, Suwon-si (KR); Song-Yean Cho, Seoul (KR); Beom-Sik Bae, Suwon-si (KR); Han-Na Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 213 days.

(21) Appl. No.: 14/130,834

(22) PCT Filed: Jul. 4, 2012

(86) PCT No.: PCT/KR2012/005300
§ 371 (c)(1),
(2), (4) Date: Jan. 3, 2014

(87) PCT Pub. No.: WO2013/005982
PCT Pub. Date: Jan. 10, 2013

(65) Prior Publication Data
US 2014/0140334 A1 May 22, 2014

(30) Foreign Application Priority Data

Jul. 4, 2011 (KR) .................. 10-2011-0066171

(51) Int. Cl.
*H04W 76/02* (2009.01)
*H04W 8/08* (2009.01)
*H04W 92/06* (2009.01)
*H04L 29/12* (2006.01)

(52) U.S. Cl.
CPC ............. *H04W 76/02* (2013.01); *H04W 8/082* (2013.01); *H04W 92/06* (2013.01); *H04L 61/2015* (2013.01)

(58) Field of Classification Search
None
See application file for complete search history.

(56) References Cited

U.S. PATENT DOCUMENTS

| 2008/0069121 A1 | 3/2008 | Adamson et al. |
| 2010/0124228 A1 | 5/2010 | Tinnakornsrisuphap et al. |
| 2012/0039323 A1* | 2/2012 | Hirano ................ H04W 36/385 370/338 |

(Continued)

FOREIGN PATENT DOCUMENTS

| JP | 2010-213273 A | 9/2010 |
| KR | 10-2007-0032685 A | 3/2007 |

OTHER PUBLICATIONS

3rd Generation Partnership Project; Technical Specification Group Services and System Aspects; LIPA Mobility and SIPTO at the Local Network; (Release 11), 3GPP TR 23.859, Apr. 27, 2011, pp. 1-15, vol. 2.0, 3GPP, Sophia Antipolis, France.

(Continued)

*Primary Examiner* — Duc Duong
(74) *Attorney, Agent, or Firm* — Jefferson IP Law, LLP

(57) ABSTRACT

Disclosed is an apparatus and a method of establishing an interface between entities in a local network. A stand-alone local H(e)NB network has a structure in which one or more H(e)NBs are separated from one or more L-GWs in order to support mobility of a user equipment. The one or more H(e)NBs or the one or more L-GWs provide an information management device with information necessary for establishing an interface and receive information necessary for establishing the interface with a target entity as a response to the provision of the information. The one or more H(e)NBs or the one or more L-GWs establish the interface with the target entity based on the received information.

10 Claims, 6 Drawing Sheets

(56) References Cited

U.S. PATENT DOCUMENTS

| | | | |
|---|---|---|---|
| 2012/0207129 A1* | 8/2012 | Sun | H04W 76/027 370/331 |
| 2012/0224536 A1* | 9/2012 | Hahn | H04L 45/00 370/328 |
| 2012/0275310 A1* | 11/2012 | Watfa | H04W 8/082 370/238 |
| 2013/0028237 A1* | 1/2013 | Cheng | H04W 36/0016 370/331 |
| 2013/0148621 A1* | 6/2013 | Laitila | H04W 68/00 370/329 |
| 2014/0059192 A1* | 2/2014 | Miklos | H04W 8/082 709/221 |

OTHER PUBLICATIONS

Huawei et al., L-GW Discovery in a Stand-Alone Architecture, 3GPP TSG SA WG2 Meeting #84, Bratislava, Slovakia, Apr. 11-15, 2011, pp. 1-4, TD S2-111507, 3GPP, Sophia Antipolis, France.

3GPP TR 23.859 v0.3.0 3rd Generation Partnership Project; Technical Specification Group Services and System Aspects; LIPA Mobility and SIPTO at the Local Network; (Release 11), May 2011.

* cited by examiner

APPARATUS AND METHOD OF ESTABLISHING INTERFACE IN A LOCAL NETWORK

TECHNICAL FIELD

The present invention relates to an apparatus and a method of establishing an interface in a local network, and more particularly, to an apparatus and a method of establishing an interface between entities in a local network.

BACKGROUND ART

In general, a local network, which is a local area network, refers to a network for processing or transmitting information generated by various communication terminals or information processing terminals including a host computer or a work station installed in a limited area, such as a building and a factory, by using wired or wireless resources.

LIPA Mobility and SIPTO at the Local Network (LIMO-NET, hereinafter, referred to as an "extended local network"), which is an example of the local network, may be referred to as an extended network architure of a Local IP Access and Selected IP Traffic Office (LIPA-SIPTO).

The extended local network aims to support session continuity in the local network considering mobility between femto cell base stations (H(e)NB) installed in a home network or a company network and provide a traffic offload function, which has been considered in a macro network, even in the local network.

For example, the extended local network suggests the direct transfer of data traffic of a User Equipment (UE) accessing through the H(e)NB to other devices at home or a company network through a Local-Gateway (L-GW), not transferring the data traffic to a core network that is a network of a mobile communication service provider.

FIG. 1 illustrates an example of a structure of a conventional extended local network, in which an H(e)NB and an L-GW are unified and jointly operated. Hereinafter, the extended local network having the structure in which the H(e)NB and the L-GW are unified and jointly operated is called a "collocated local network".

H(e)NB 106 and L-GW 104 coexisting in the collocated local network illustrated in FIG. 1 may be determined as a single logical and/or physical entity 102, and the H(e)NB 106 and the L-GW 104 exchange information through internal interfaces.

Accordingly, a UE 100 may exchange information with other IP devices 108 through the H(e)NB 106 and the L-GW 104 configuring the single entity 102. For example, a user packet provided from the UE 100 to the H(e)NB 106 is transferred to the L-GW 104 through an internal interface and the user packet transferred to the L-GW 104 is provided to other designated IP devices 108.

However, the collocated local network illustrated in FIG. 1 has an advantage of a simple structure, but its structure has a difficulty in satisfying the mobility of the UE.

FIG. 2 illustrates an example of a structure of a conventional extended local network considering mobility, in which an H(e)NB and an L-GW are separated from each other. That is, FIG. 2 defines that the H(E)NB and the L-GW may be separated and independently configured. Hereinafter, the extended local network having the structure in which the H(E)NB and the L-GW are separated is called a "stand-alone local network".

Respective stand-alone local H(e)NB networks 210 and 220 in FIG. 2 may be defined as a set of H(e)NBs 214, 216, and 218, or 224 and 226 connectable to local PDNs 230 and 240 through one or more L-GWs 212 and 222 by a unique IP address. In this case, the L-GW 212 or 222 belongs to only one stand-alone local H(e)NB network 210 or 220, and may access by the one or more PDNs 230 and 240.

In a technical report concerning the stand-alone local H(e)NB network, requirements for a scenario and a structure for a continuity of a Selected IP Traffic Office (SIPTO) session according to mobility and movement in a local network are defined. In addition, the technical report includes the stipulation of main issues and a structure for a solution for satisfying the requirements for the structure, L-GW selection and addressing, a discovery of a region for a Local IP Access (LIPA), an LIPA deactivation, etc.

However, all solutions for supporting the stand-alone local H(e)NB network have not been prepared yet, so that a method of solving a significant issue which has been discussed in relation to the existing stand-alone local H(e)NB network is urgently required. Especially, it is necessary to prepare a method of supporting a session continuity based on mobility of the UE in the stand-alone local H(e)NB network.

In addition, since a user may be free to buy and install or remove the H(e)NB 206 or the L-GW 204 in the local network, method of the H(e)NB and the L-GW discovering each other and making a connection there between in a dynamic configuration is required.

DISCLOSURE OF INVENTION

Technical Problem

Accordingly, an aspect of the present invention is to solve the above-stated problems occurring in the prior art and to provide an apparatus and a method of establishing an interface between separated entities in order to support mobility of a UE in a local network.

Also, another aspect of the present invention is to provide an apparatus and a method of establishing an interface through separated L-GW and H(e)NB recognizing each other and forming a connection between the L-GW and the H(e)NB in order to support mobility of a UE in a local network.

Further, another aspect of the present invention is to provide an apparatus and a method of, by each of separated entities, transferring information for making a target entity recognize each of the separated entities in order to establish an interface with the target entity by each of the separated entities, in order to support mobility of a UE in a local network.

Furthermore, another aspect of the present invention is to provide an apparatus and a method of obtaining information transferred from a target entity and establishing an interface with the target entity recognized based on the obtained information by each of separated entities, in order to support mobility of a UE in a local network.

Solution to Problem

In accordance with an aspect of the present invention, there is provided a method of establishing an interface between one or more base stations (H(e)NBs) and one or more gateways (L-GWs) in a stand-alone local network having a structure in which the one or more H(e)NBs are separated from the one or more L-GWs in order to support mobility of a user equipment, the method including: providing an information management device accessible by all of the one or more H(e)NBs and the one or more L-GWs with self information at least containing a local address and a core address of a first entity and identification information on the stand-alone local network, by the first entity corresponding to one of the one or more H(e)NBs and the one or more L-GWs; receiving self information on a target entity at least containing a local address list and a core address list of the target entity and identification information on the stand-alone local network or location information containing the recorded self information on the target entity from the information management device as a response to the provision of the self information, by the first entity, the target entity corresponding to one or more second entities with which the first entity is to newly establish an interface; when the first entity receives the location information from the information management device, obtaining the self information on the target entity by using the received location information, by the first entity; and establishing the interface with the target entity based on the received self information or the obtained self information, by the first entity, wherein the first entity and the target entity are different types of entities.

In accordance with another aspect of the present invention, there is provided an apparatus for establishing an interface between one or more base stations (H(e)NBs) and one or more gateways (L-GWs) in a stand-alone local network having a structure in which the one or more H(e)NBs are separated from the one or more L-GWs in order to support mobility of a user equipment, the apparatus being included in each of the one or more H(e)NBs and the one or more L-GWs corresponding to a serving entity, the apparatus including: a broadcaster for transmitting self information at least containing a local address and a core address of the serving entity and identification information on the stand-alone local network to an information management device accessible by all of the one or more H(e)NBs and the one or more L-GWs; a listener for receiving self information on a target entity at least containing a local address list and a core address list of the target entity corresponding to one or more second entities for which an interface is to be newly established and identification information on the stand-alone local network or location information containing the recorded self information on the target entity as a response to the provision of the self information from the information management device; and an interface establishing unit for, when the location information is received from the information management device, obtaining the self information on the target entity by using the received location information by controlling the broadcaster and the listener and establishing the interface with the target entity based on the received self information or the obtained self information, wherein the entity including the apparatus for establishing the interface and the target entity are different types of entities.

Advantageous Effects of Invention

According to the embodiment of the present invention, it is possible to support mobility of the UE in the stand-alone local H(e)NB network by physically separating the base station (H(e)NB) and the gateway (L-GW) in the stand-alone local H(e)NB network and defining the establishment of the interface between the separated base station (H(e)NB) and the gateway (L-GW).

Further, when a base station (H(e)NB) or a gateway (L-GW) is newly installed, the previously installed base station (H(e)NB) or gateway (L-GW) is able to easily recognize the newly installed base station (H(e)NB) and gateway (L-GW).

In the meantime, other various effects will be directly or implicitly disclosed in the detailed description of the embodiment of the present invention below.

MODE FOR THE INVENTION

In the following description, only parts necessary for understanding operations according to an embodiment of the present invention will be described, and detailed explanation of known related functions and constitutions may be omitted so as to avoid unnecessarily obscuring the subject manner of the present invention.

Further, the embodiments of the present invention will be described in detail mainly based on a specific system (e.g. a $3^{rd}$ Generation Partnership Project (3GPP) LIMONET system). However, slight modification of the suggested embodiments will be applied to other communication/computer systems having a similar technical background and system form according to a determination of one having conventional technical knowledge in the same technical field within a scope within a technical spirit of the invention.

In the following detailed description of the present invention, a detailed operation according to various embodiments for establishing an interface for supporting communication through mutual discovery and connection by making entities, i.e. a plurality of L-GWs and H(e)NBs, share self information between the plurality of L-GWs and H(e)NBs in the LIMONET will be described.

To this end, a stand-alone local H(e)NB network has a structure in which one or more base stations and one or more gateways are separated in order to support mobility of a UE. The one or more base stations and one or more gateways provide an information management device with information necessary for establishing an interface and receive information necessary for establishing the interface with a target entity as a response of the provided information. The one or more base stations and one or more gateways establish the interface with the target entity based on the received information.

Hereinafter, an exemplary embodiment of the present invention will be described with reference to accompanying drawings in detail.

Figure 1:
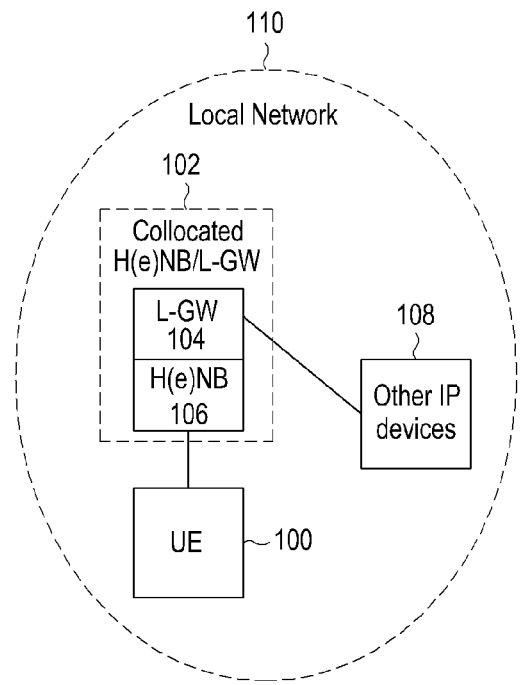
FIG. 1 illustrates an example of a structure of a conventional extended local network, in which an H(e)NB and an L-GW are unified and jointly operated.
Figure 2:
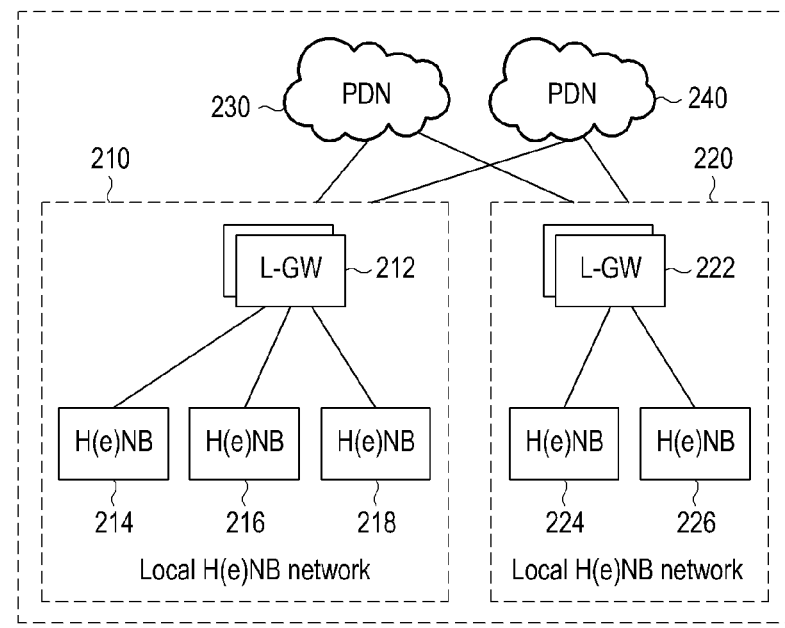
FIG. 2 illustrates an example of a structure of a conventional extended local network considering mobility, in which an H(e)NB and an L-GW are separated from each other.
Figure 3:
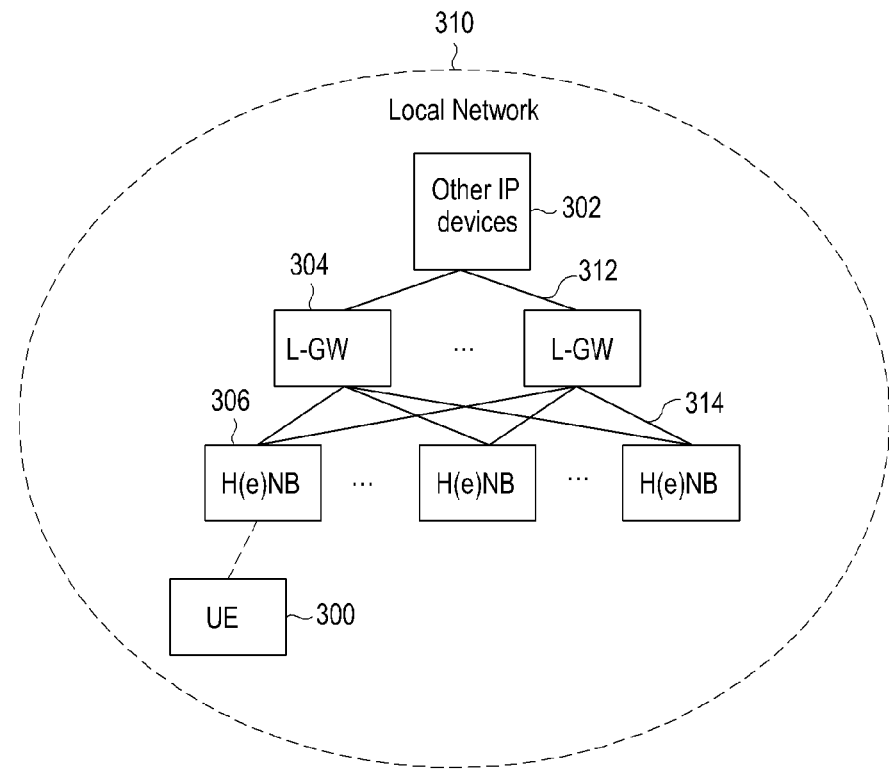
FIG. 3 illustrates an example of a structure of a stand-alone local H(e)NB network to which an embodiment of the present invention is applied.

FIG. 3 illustrates an example of a structure of a stand-alone local H(e)NB network to which an embodiment of the present invention is applied. Although one stand-alone local H(e)NB network is considered in FIG. 3, it will be obvious that even if the one stand-alone local H(e)NB network is extended to multiple stand-alone local H(e)NB networks, each one stand-alone local H(e)NB network may have the same structure as that of FIG. 3.

Referring to FIG. 3, a mash-type connection is formed between a plurality of H(e)NBs 306 and 314 and a plurality of L-GWs 304 and 312 in a stand-alone local H(e)NB network 310. That is, one H(e)NB 306 or 304 has a connection with each of the plurality of L-GWs 304 and 312. This means that each of the L-GWs 304 and 312 is connected to the plurality of H(e)NBs 306 and 314. Further, each of the L-GWs 304 and 312 has a connection with another IP device 302 existing in the stand-alone local H(e)NB network 310.

Through the aforementioned structure of the stand-alone local H(e)NB network, a UE 300 may have continuity between a session with a previously connected H(e)NB and a session with a newly connected H(e)NB even when the UE 300 moves between the H(e)NBs 306 and 314.

Figure 4:
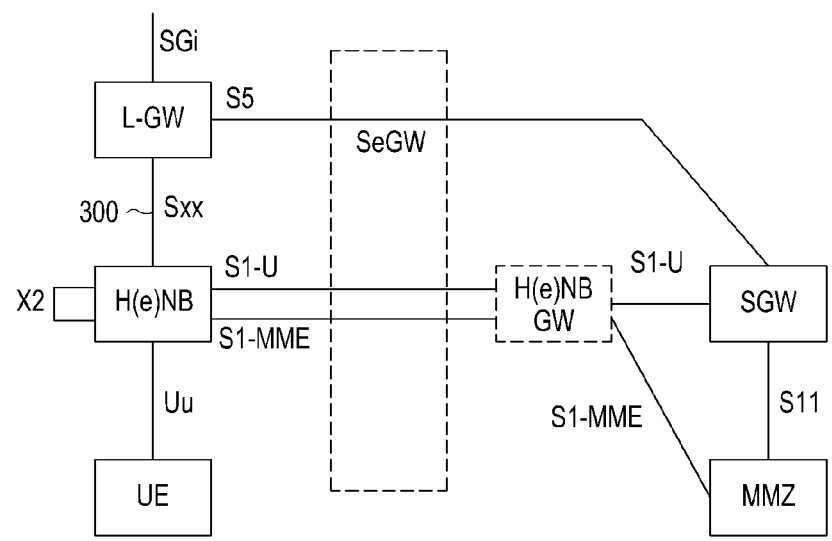
FIG. 4 is a diagram illustrating a structure in which an H(e)NB and an L-GW are separated in a stand-alone local H(e)NB network according to an embodiment of the present invention.

FIG. 4 is a diagram illustrating a structure in which an H(e)NB and an L-GW are separated in a stand-alone local H(e)NB network according to an embodiment of the present invention. Although FIG. 4 illustrates the example in which one H(e)NB and one L-GW are separated, it is a matter of course that the structure illustrated in FIG. 4 may also be identically applied to a case in which a plurality of H(e)NBs and a plurality of L-GWs are separated in the stand-alone local H(e)NB network.

Referring to FIG. 4, a new connection which does not exist in a collocated local network is necessary between the separated L-GW and H(e)NB in the stand-alone local H(e)NB network. Accordingly, a new interface is required to be defined for the connection between the L-GW and the H(e)NB. For example, a term, "Sxx interface 300" is used for a new interface.

A right side of a Security GateWay (SeGW) is a structure of the stand-alone local H(e)NB network, and a right side thereof is a structure of a core network. In this case, the interface between an entity included in the stand-alone local H(e)NB network and an entity included in the core network have been already defined in relevant technology, so their detailed description will be omitted.

In the meantime, in order to support the separated multiple L-GWs and H(e)NBs in the stand-alone local H(e)NB network, it is necessary to consider following matters.

The first issue to consider is preparation of a method of sharing self information on the L-GW and H(e)NB with each other, in order to establish an Sxx interface corresponding to the connection between the L-GW and the H(e)NB. Here, the self information means information necessary for making a connection to the Sxx interface with a target entity by a specific entity.

For example, it is required for the L-GW to notify the H(e)NB of an address in its local and core network, and it is required for the H(e)NB to notify the L-GW of an address in its local and core network.

The second issue to consider is generation of a secure connection between the L-GW and the H(e)NB. For example, when the local network is not operated in a network of a service provider, there is a high possibility that the L-GW and the H(e)NB will be exposed to danger due to malicious attack. Accordingly, it is preferable to apply a security scheme in establishing a connection between the L-GW and the H(e)NB for the safety of the entities or data within the local network. This may be achieved by providing security-related information when the L-GW or the H(e)NB is installed and starts its operation in the local network.

The third issue to consider is a method of sharing an identifier, e.g. a Local H(e)NB Network Identifier (LHN ID), for identifying the local network by the L-GW and the H(e)NB). For reference, the LHN ID is used in order to confirm that the H(e)NB and the L-GW which the UE accesses belong to a specific local network.

Considering the aforementioned consideration issue, the embodiment of the present invention suggests a method of effectively sharing the self information and the LHN ID such that a plurality of L-GWs and a plurality of H(e)NBs discover each other and make secure connections with each other in a stand-alone local H(e)NB network environment including the plurality of L-GWs and the plurality of H(e)NBs.

In this case, in order to share the self information and the LHD ID, a method of using a Dynamic Host Configuration Protocol (DHCP) message and a broadcasting mechanism or utilizing a H(e)NB Management System (HMS) is suggested. The method of utilizing the HMS may be implemented using a set parameter response message of the HMS or using a RPC download method.

According to the embodiment of the present invention, the sharing of the information, i.e. the self information, necessary for establishing an interface between the H(e)NB and the L-GW by using the DHCP message or the broadcast message may be performed only in the stand-alone local H(e)NB network. However, the sharing of the information, i.e. the self information, necessary for establishing an interface between the H(e)NB and the L-GW by using the set parameter response message of the HMS or the RPC download method may be performed through inter-working between the stand-alone local H(e)NB network and a core network.

In the following description, an embodiment in which the sharing of the self information is performed only by the stand-alone local H(e)NB network and an embodiment in which the sharing of the self information is performed by the interworking of the stand-alone local H(e)NB network and the core network will be divided and described.

In the embodiment in which the sharing of the self information is performed only by the stand-alone local H(e)NB network, the information management device is included in the stand-alone local H(e)NB network. In the embodiment in which the sharing of the self information is performed by the inter-working of the stand-alone local H(e)NB network and the core network, the information management device is included in the core network.

In this case, the information management device is required to be able to access all entities within the stand-alone local H(e)NB network regardless of the embodiments.

First, the embodiment in which the sharing of the self information is performed only by the stand-alone local H(e)NB network will be described with reference to FIGS. 5 and 6.

Figure 5:
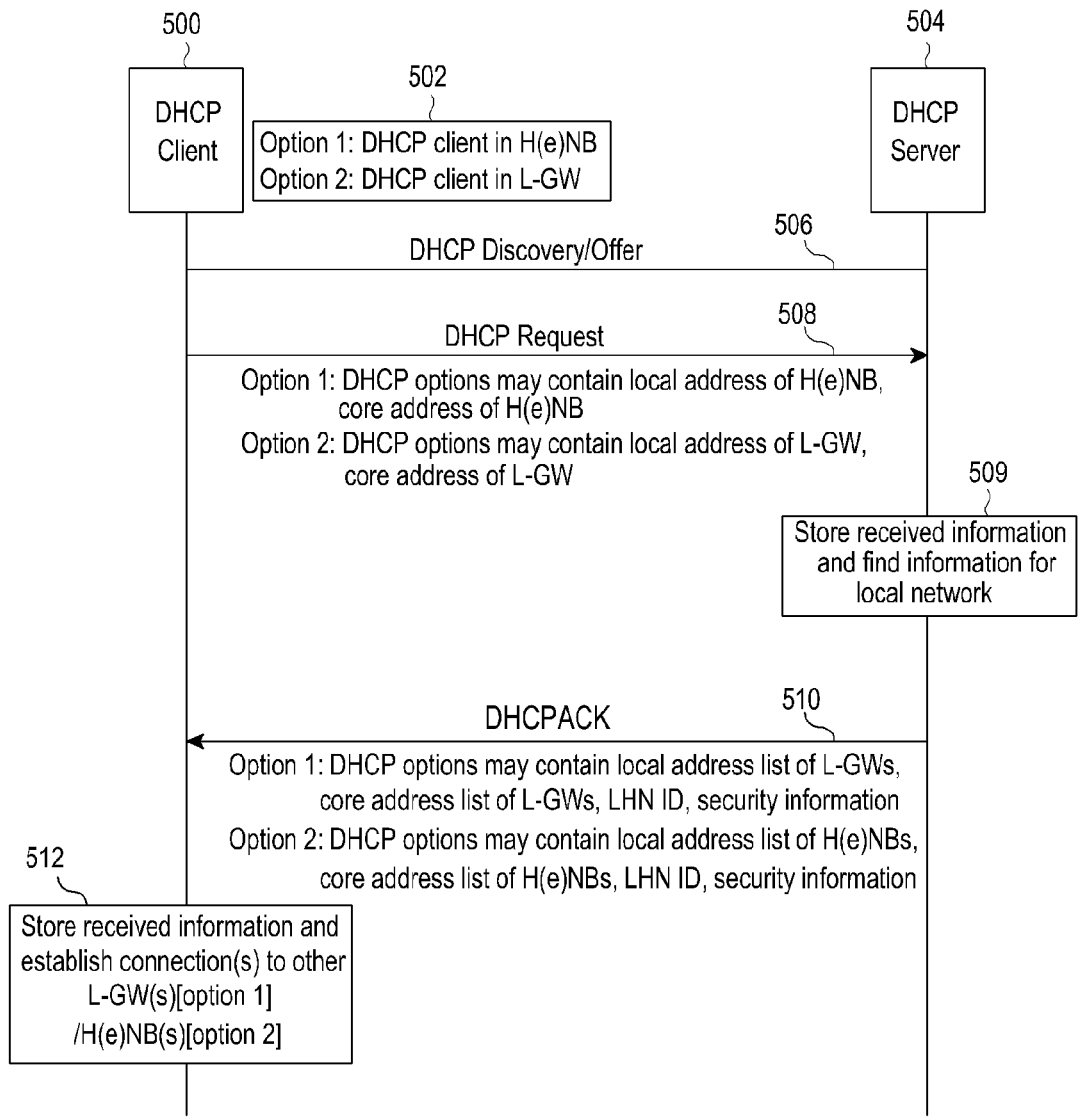
FIG. 5 is a flowchart illustrating a signal processing for establishing an interface between an H(e)NB and an L-GW by using a DHCP message in a stand-alone local H(e)NB network according to an embodiment of the present invention.

FIG. 5 is a flowchart illustrating a signal processing for establishing an interface between the H(e)NB and the L-GW by using a DHCP message in the stand-alone local H(e)NB network according to an embodiment of the present invention. That is, FIG. 5 illustrates an example in which the L-GW and the H(e)NB use the DHCP message for sharing self information on a target entity. Here, the self information contains local and core addresses of a target entity, information for connection security, and an LHN ID.

In FIG. 5, the DHCP client 500, which is an entity for transmitting the DHCP message, is referred to as any one between the L-GW and the H(e)NB included in the stand-alone local H(e)NB network. For convenience's sake, it is assumed that a case in which a DHCP client 500 is the H(e)NB is option 1 and a case in which the DHCP client 500 is the L-GW is option 2.

In FIG. 5, a DHCP server 504 may be included in an inside or an outside of the stand-alone local H(e)NB network in order to manage the self information transmitted using the DHCP message.

Referring to FIG. 5, the DHCP client 500 searches for the DHCP server 504 through a discovery/offer process (step 506).

The DHCP client 500 discovering the DHCP server 504 inserts a local address and a core address of the DHCP client 500 in a DHCP option field of a DHCP request message and transmits the DHCP request message to the DHCP server 504 (step 508).

For example, according to option 1, the DHCP option field of the DHCP request message contains a local address and a core address of the H(e)NB, and according to option 1, the DHCP option field of the DHCP request message contains a local address and a core address of the L-GW. Here, the local address is an address allocated to the DHCP client 500, i.e. the H(e)NB or the L-GW, from the stand-alone local H(e)NB network, and the core address is an address allocated to the DHCP client 500, i.e. the H(e)NB or the L-GW, from the core network.

The DHCP server 504 stores the self information received through the DHCP request message and the information found for the stand-alone local H(e)NB network (step 509). In this case, it is preferable that the DHCP server 504 stores only new self information which has not been received so far, rather than stores all self information received through the DHCP request message.

The DHCP server 504 transmits a DHCP response message (DHCP ACK) containing the self information, which has been received from a target entity and stored, to the DHCP client 500 in a response to the reception of the DHCP request message (step 510). Here, the target entity is any one of the H(e)NB and the L-GW.

For example, the target entity is the L-GW in option 1, and the target entity is the H(e)NB in option 2.

Accordingly, the DHCP option field of the DHCP response message contains an LHN ID and security information, in addition to a local address list and a core address list of the L-GW according to option 1. The DHCP option field of the DHCP response message contains an LHN ID and security information, in addition to a local address list and a core address list of the H(e)NB according to option 2.

For example, the security information contains various key values and a type of security mechanism.

The DHCP client 500 stores the self information on the target entity received from the DHCP server 504 through the DHCP response message, and sets a connection with the target entity by using the stored self information on the target entity. In this case, the DHCP client 500 preferably selects new self information and stores the selected new self information. Further, the setting of the connection is preferably performed only on the target entity with which a connection has not been established yet. Here, the target entity is the L-GW according to option 1, and the target entity is the H(e)NB according to option 2.

Figure 6:
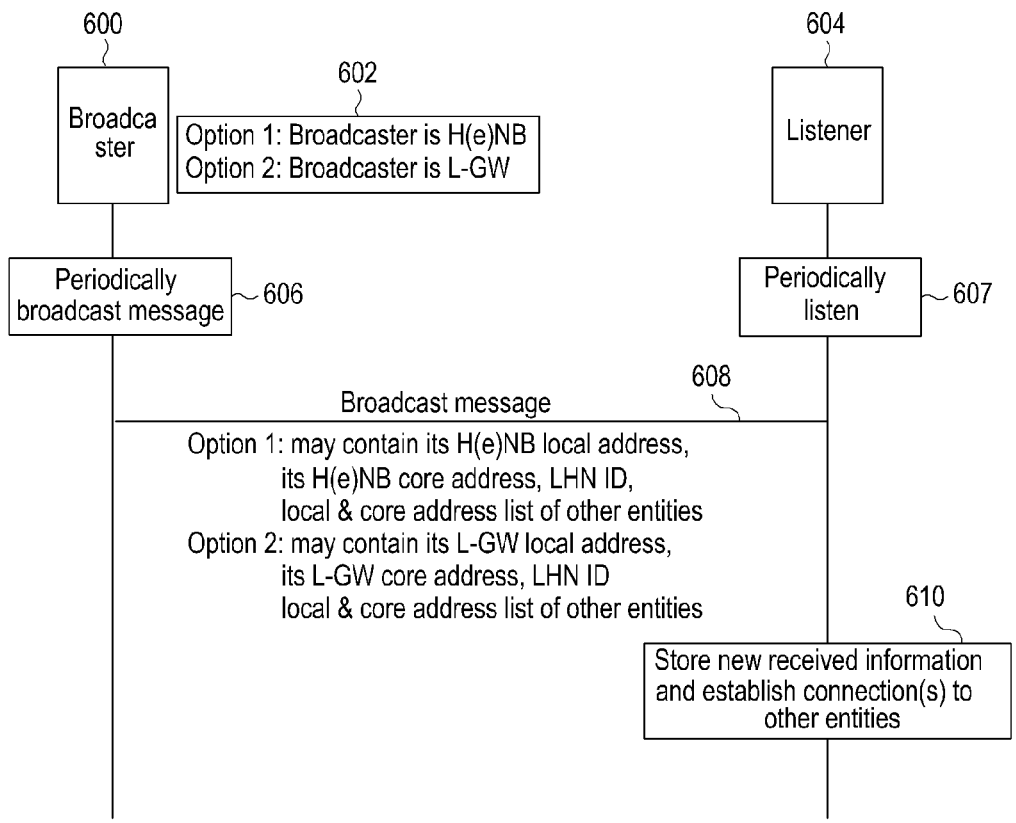
FIG. 6 is a flowchart illustrating a signal processing for establishing an interface between an H(e)NB and an L-GW by using a broadcast message in a stand-alone local H(e)NB network according to another embodiment of the present invention.

FIG. 6 is a flowchart illustrating a signal processing for establishing an interface between the H(e)NB and the L-GW by using a broadcast message in the stand-alone local H(e)NB network according to another embodiment of the present invention. FIG. 6 illustrates an example in which the L-GW and the H(e)NB use the broadcast message for sharing self information on a target entity. Here, the self information contains a local address list and a core address list of another entity, in addition to local and core address of a target entity and connection security information.

In FIG. 6, a broadcaster 600, which is an entity for transmitting the broadcast message, is referred to as any one between the L-GW and the H(e)NB included in the stand-alone local H(e)NB network. For convenience's sake, it is assumed that a case in which a broadcaster 600 is the H(e)NB is option 1 and a case in which the broadcaster 600 is the L-GW is option 2. In this case, an applicable broadcasting scheme may include various protocols, such as UPnP, having a corresponding characteristic.

In FIG. 6, a listener 604, which is an entity for managing self information transmitted by the broadcaster 600 by using the broadcast message, is referred to as any one between the L-GW and the H(e)NB included in the stand-alone local H(e)NB network. In this case, the listener 604 is the L-GW when the broadcaster 600 is the H(e)NB, and the listener 604 is the H(e)NB when the broadcaster 600 is the L-GW.

Referring to FIG. 6, the broadcaster periodically transmits the broadcast message (step 606), and the listener 604 periodically listens to the broadcast message periodically transmitted by the broadcaster (step 607).

For example, the broadcaster 600 generates a broadcast message based on information on the stand-alone local H(e)NB network which the broadcaster 600 has previously recognized, as well as its self information, and periodically transmits the generated broadcast message (step 608).

For example, the information for generation of the broadcast message contains a local address and a core address of the broadcaster 600, an LHN ID, and a local address list and a core address list of other entities. That is, the broadcast message include a local address and a core address of the H(e)NB according to option 1, and the broadcast message include a local address and a core address of the L-GW according to option 2.

The listener 604 receives the broadcast message periodically transmitted by the broadcaster 600 and stores new self information included in the received broadcast message. When there is a target entity with which a connection has not been established yet, the listener 604 sets a connection with the target entity by using the stored self information received through the broadcast message transmitted from the target entity.

Next, the embodiment in which the sharing of the self information is performed by the inter-working of the standalone local H(e)NB network and the core network will be described with reference to FIGS. 7 to 9.

In the embodiment to be described, local and core addresses and an LHN ID of a target entity, and information for making a security applied connection are provided to a specific entity to the information management device by using the HMS. In this case, when the specific entity is the L-GW, the target entity is the H(e)NB, and when the specific entity is the H(e)NB, the target entity is the L-GW.

Figure 7:
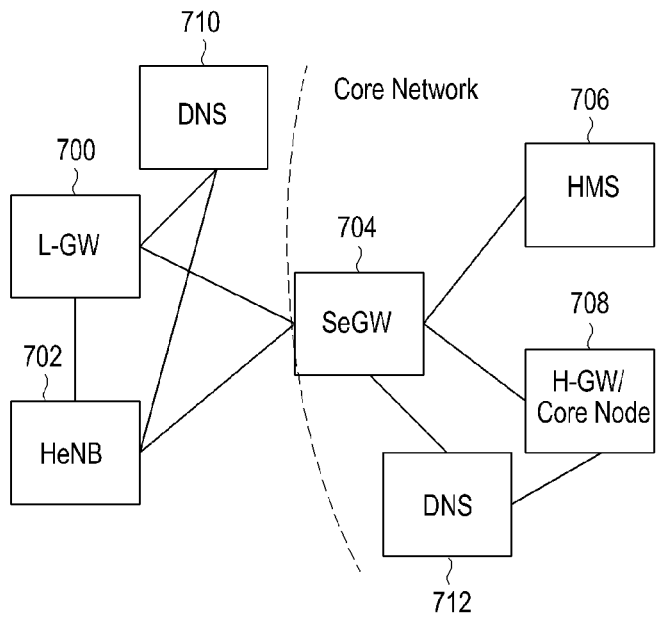
FIG. 7 is a diagram illustrating a network structure in a case of using an HMS according to an embodiment of the present invention.

FIG. 7 is a diagram illustrating a network structure in a case of using the HMS according to the embodiment of the present invention.

Referring to FIG. 7, the stand-alone local H(e)NB network includes a DNS 710, a L-GW 700, and an H(e)NB 702, and the core network includes an SeGW 704, an HMS 706, H-GW/core node 708, and an DNS 712.

The HMS 706 generally exists within a service provider network and stores configuration information related to the H(e)NB 702 and the L-GW 700. In the meantime, when the HMS 706 exists within the service provider network, the H(e)NB 702 and the L-GW 700 may be selectively connected to the HMS 706 through the SeGW 704 for security.

Figure 8:
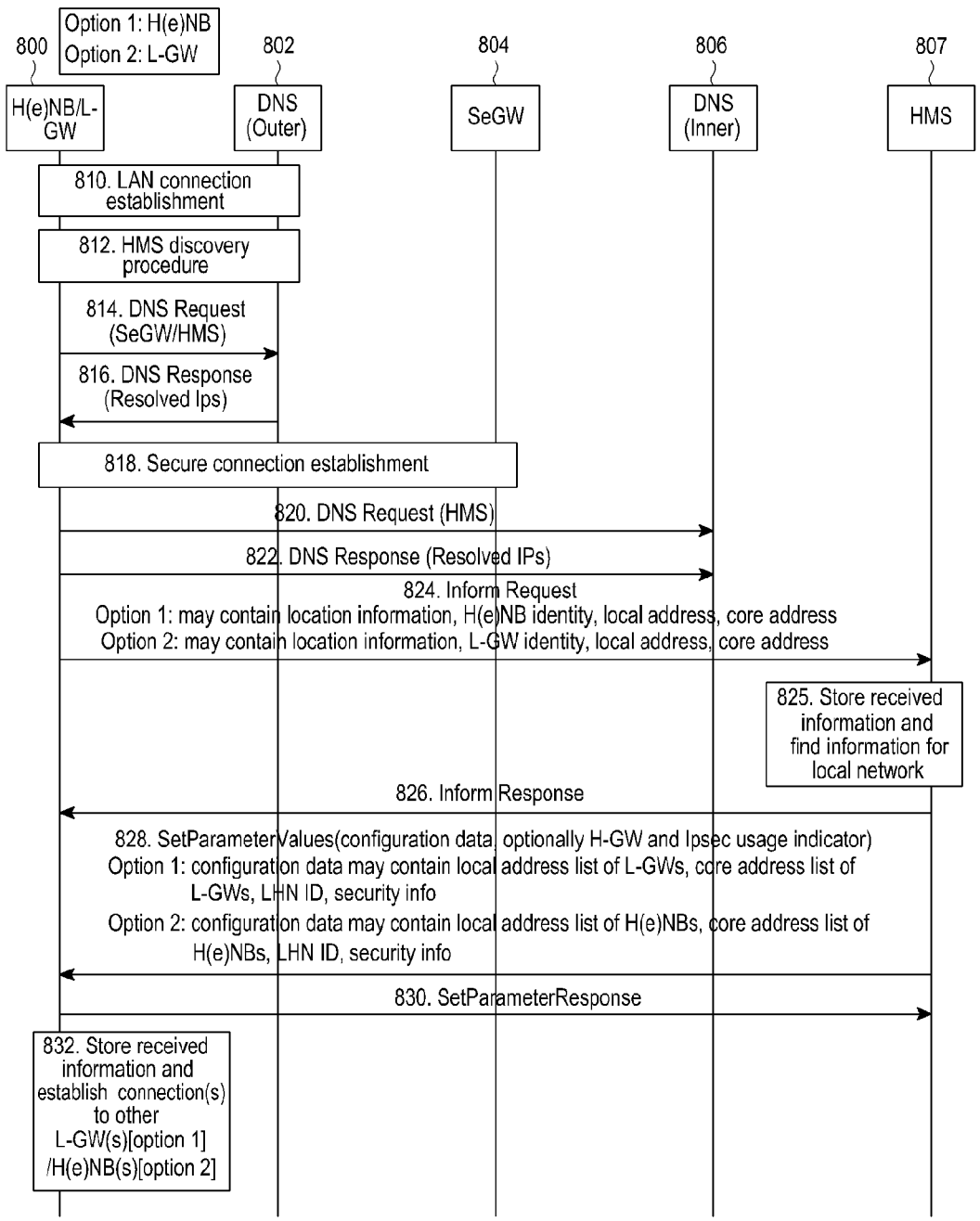
FIG. 8 is a flowchart illustrating a procedure of a signal processing for establishing an interface between entities by using an HMS managing self information on each entity according to an embodiment of the present invention.

FIG. 8 is a flowchart illustrating a procedure of a signal processing for establishing an interface between entities by using the HMS managing self information on each entity according to an embodiment of the present invention. That is, FIG. 8 illustrates the embodiment in which local and core addresses and an LHN ID of a target entity, and information for making a security applied connection are provided to a specific entity by using the HMS. Here, it is assumed that a case in which the target entity is the L-GW is option 1, and a case in which the target entity is the H(e)NB is option 2.

In the following description, a specific entity refers to an entity corresponding to a subject of an operation for establishing the Sxx interface and a target entity refers to an entity corresponding to a target for which the specific entity is to establish the Sxx interface. Accordingly, the H(e)NB is the specific entity and the L-GW is the target entity according to option 1, and the L-GW is the specific entity and the H(e)NB is the target entity according to option 2.

Referring to FIG. 8, a specific entity sets a connection with the LAN as an initial operation for using the Internet through the stand-alone local H(e)NB network (step 810). Then, the specific entity obtains basic information on the SeGW 704 and the HMS 706 through the DNS 710 existing in an outside of a service provider network (step 812).

The specific entity makes a DNS query for obtaining an address of the SeGW 704 by using the obtained basic information on the SeGW 704 (step 814). In this case, the connection with the HMS 706 is formed in an outside of an IP Sec connection, the specific entity may also request an address of the HMS 706. The specific entity receives a DNS response containing the IP address of the SeGW 704 (step 816).

Then, the specific entity makes a security applied connection with the SeGW 704 by using the IP address of the SeGW 704 contained in the received DNS response (step 818). When the connection between the specific entity and the HMS 706 is formed in an inside of the IP Sec, the specific entity performs additional processes, such as a DNS request and a DNS response, for obtaining a core address of the HMS 706 (steps 820 and 822).

The specific entity transmits an information request message demanding configuration information to the HMS 706 by using the core address of the HMS 706 (step 824). The information request message may additionally contain a local network address and a core network address of the specific entity, as well as location information and identification information which are basic information on the specific entity.

For example, the information request message contains local and core addresses of the H(e)NB, in addition to position information and identification information on the H(e)NB according to option 1, and the information request message contains local and core addresses of the L-GW, in addition to position information and identification information on the L-GW according to option 2.

When the HMS 706 receives the information request message from the specific entity, the HMS 706 stores new information contained in the received information request message, and searches for information related to the stand-alone local H(e)NB network to which the specific entity transmitting the information request message belongs (step 825).

The HMS 706 transmits an information request message as a response to the information request message to the specific entity (step 826). The HMS 706 transmits configuration data and a Set_Parameter_Value message optionally containing an H-GW and an IP Sec indicator to the specific entity (step 828).

For example, the configuration data contained in the Set_Parameter_Value message may contain a local address list and a core address list of the L-GW, an LHN ID, and security information to be used when the security applied connection is established according to option 1. Further, the configuration data contained in the Set_Parameter_Value message may contain a local address list and a core address list of the H(e)NB, an LHN ID, and security information to be used when the security applied connection is established according to option 2. Here, the security information contains various key values and a type of security mechanisms.

The specific entity makes a report to the HMS 706 that the configuration information is successfully received through a response message corresponding to the received Set_Parameter_value message (step 830).

When there is a target entity with which the connection is not established, the specific entity performs a process for establishing the connection with the target entity (step 832).

In the meantime, a temporal execution order of steps 825 and 826 of FIG. 8 is not important. That is, the execution order of steps 825 and 826 may be changed.

Figure 9:
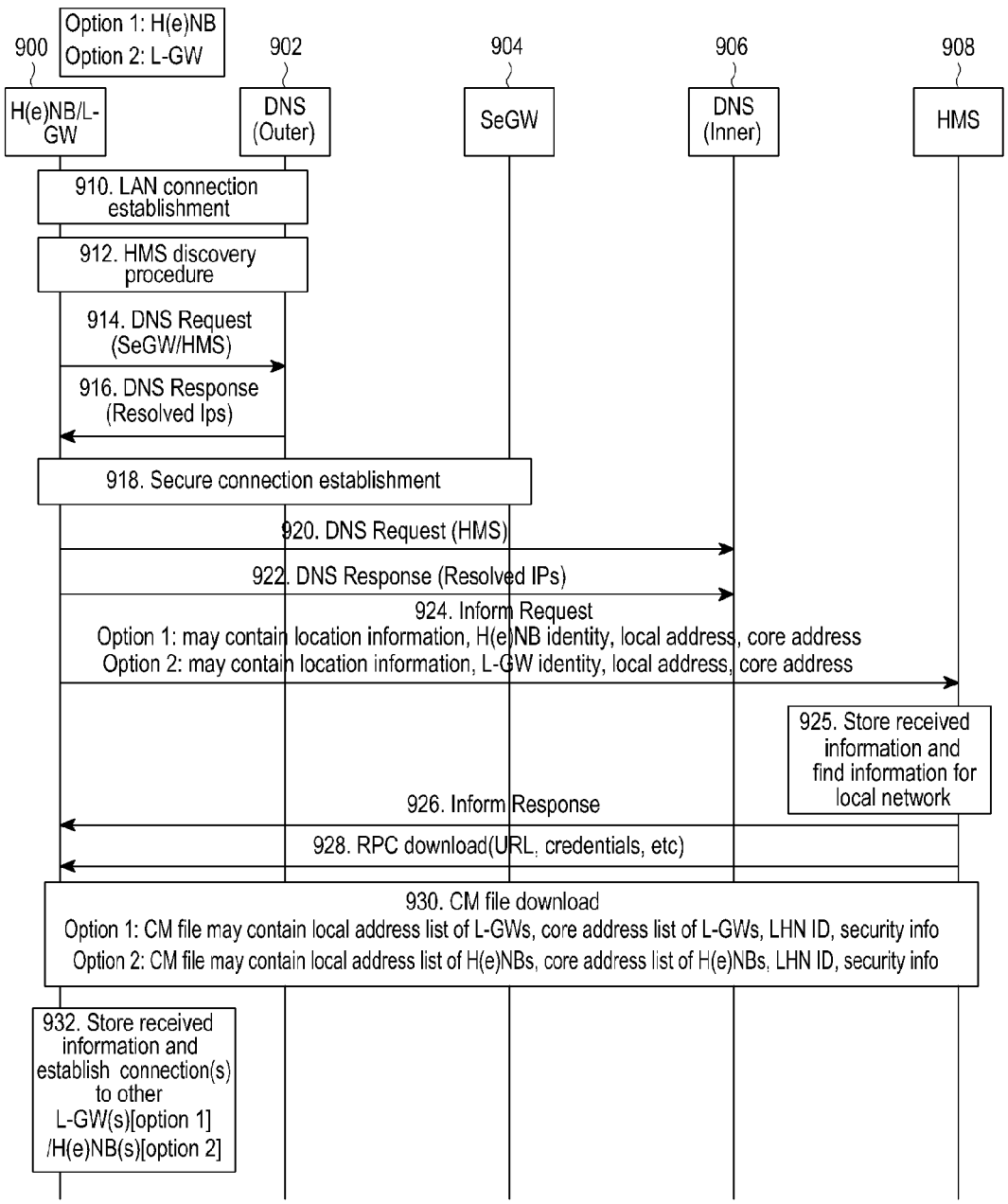
FIG. 9 is a flowchart illustrating a procedure of a signal processing for establishing an interface between entities by using self information obtained through location information provided by an HMS according to an embodiment of the present invention.

FIG. 9 is a flowchart illustrating a procedure of a signal processing for establishing an interface between entities by using self information obtained through location information provided by an HMS according to an embodiment of the present invention.

Operations according to steps 910 to 926 and step 932 among steps illustrated in FIG. 9 are the same as those according to steps 810 to 826 and step 832 among the steps illustrated in FIG. 8. Accordingly, the detailed descriptions of the operations according to steps 910 to 926 will be omitted.

However, in order to transfer the self information on the target entity, the Set_Parameter_Value message is used in FIG. 8, but the RPC download scheme is used in FIG. 9. That is, the operation of FIG. 9 is different from the operation according to FIG. 8 in that the HMS 706 does not directly provide a specific entity with self information on a target entity, but provides a specific entity with location information through which self information on a target entity may be obtained.

To describe it in more detail, the HMS 706 commands a specific entity to download a file containing configuration information (step 928). In this case, the HMS 706 transmits an address for downloading both a file and security information related to the corresponding file to the specific entity. The specific entity downloads a CM file from a file server managing self information on each entity by using the location information received from the HMS 706. The file server may be included in the HMS 706 or a separate server.

For example, when the specific entity is the L-GW, the downloaded CM file may contain a local address list and a core address list of the H(e)NB existing within the stand-alone local H(e)NB network, an LHN ID, and security information to be used for a security applied connection. The security information contains information on various key values and a type of security mechanisms.

However, when the specific entity is the H(e)NB, the downloaded CM file may contain a local address list and a core address list of the L-GW existing within the stand-alone local H(e)NB network, an LHN ID, and security information to be used for a security applied connection.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

The invention claimed is:

1. A method of establishing an interface between one or more base stations (H(e)NBs) and one or more gateways (L-GWs) in a standalone local network having a structure in which the one or more H(e)NBs are separated from the one or more L-GW s in order to support mobility of a user equipment, the method comprising:
    providing an information management device accessible by all of the one or more H(e)NBs and the one or more L-GW s with self information at least containing a local address and a core address of a first entity and identification information on the stand-alone local network, by the first entity corresponding to one of the one or more H(e)NBs and the one or more L-GWs;
    receiving self information on a target entity at least containing a local address list and a core address list of the target entity and identification information on the stand-alone local network or location information containing the received self information on the target entity from the information management device as a response to a provision of the self information, by the first entity, the target entity corresponding to one or more second entities with which the first entity is to newly establish an interface;
    when the first entity receives the location information from the information management device, obtaining the self information on the target entity by using the received location information, by the first entity; and
    establishing the interface with the target entity based on the received self information or the obtained self information, by the first entity,
    wherein the first entity and the target entity are different types of entities.

2. The method as claimed in claim 1, wherein when the first entity directly provides the self information to the target entity by using a broadcast message, the self information on the first entity further contains a local address list and a core address list of another entity, which the first entity has recognized.

3. The method as claimed in claim 2, further comprising:
    receiving the self information on the target entity broadcasted from the target entity; and
    establishing the interface with the target entity based on the received self information on the target entity, by the first entity.

4. The method as claimed in claim 1, wherein when the first entity transmits the self information by using a dynamic host configuration protocol message, the self information on the target entity further contains security information.

5. The method as claimed in claim 4, wherein the information management device is an H(e)NB Management System (HMS) configuring a core network connected to the stand-alone local network.

6. An apparatus for establishing an interface between one or more base stations (H(e)NBs) and one or more gateways (L-GWs) in a standalone local network having a structure in which the one or more H(e)NBs are separated from the one or more L-GW s in order to support mobility of a user equipment, the apparatus being included in each of the one or more H(e)NBs and the one or more L-GWs corresponding to a serving entity, the apparatus comprising:
    a broadcaster configured to transmit self information at least containing a local address and a core address of the serving entity and identification information on the stand-alone local network to an information management device accessible by all of the one or more H(e)NBs and the one or more L-GWs;
    a listener configured to receive self information on a target entity at least containing a local address list and a core address list of the target entity corresponding to one or more second entities for which an interface is to be newly established and identification information on the stand-alone local network or location information containing the received self information on the target entity as a response to a provision of the self information from the information management device; and
    a controller configured to:
        when the location information is received from the information management device, obtain the self information on the target entity by using the received location information by controlling the broadcaster and the listener, and
        establish an interface with the target entity based on the received self information or the obtained self information,
    wherein the serving entity including the apparatus for establishing the interface and the target entity are different types of entities.

7. The apparatus as claimed in claim 6, wherein when the broadcaster directly provides the self information to the target entity by using a broadcast message, the directly provided self information further contains a local address list and a core address list of another entity, which the broadcaster has recognized.

8. The apparatus as claimed in claim 7, wherein when the listener receives the self information on the target entity broadcasted from the target entity, the controller establishes the interface with the target entity based on the received self information on the target entity.

9. The apparatus as claimed in claim 6, wherein when the broadcaster transmits the self information by using a dynamic host configuration protocol message, the self information on the target entity further contains security information.

10. The apparatus as claimed in claim 9, wherein the information management device is an H(e)NB Management System (HMS) configuring a core network connected to the stand-alone local network.

\* \* \* \* \*